Patented May 9, 1933

1,907,545

UNITED STATES PATENT OFFICE

LOUIS H. HOWLAND, OF NUTLEY, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.   Application filed June 4, 1932.   Serial No. 615,459.

This invention relates to the treatment of rubber and rubber-like products, and more particularly is concerned with methods of increasing their resistance to ageing, and with the resulting products.

An object is to provide a class of chemicals which will retard the deterioration of rubber. A further object is to provide a class of rubber antioxidants some of which do not appreciably discolor the rubber during ageing.

It has been found that the reaction products of amino-diarylamines and acid anhydrides or acid chlorides serve these purposes. The materials have the following probable general formula $(R_1-NH-R_2-NH)_n-Y$ where $R_1$ represents an aryl group, $R_2$ an arylene group and Y an acidyl group and $n$ is one or two depending on whether Y is monovalent or divalent. The materials are further called acidylamino diarylamines. The p-acidylamino diarylamines have been found particularly desirable, rubber stocks containing them being especially resistant to discoloration. The scheme of the reaction is shown by either one of the following equations depending on whether the acid anhydride or the acid chloride is used, but it is to be understood other method may be used for preparing the materials:

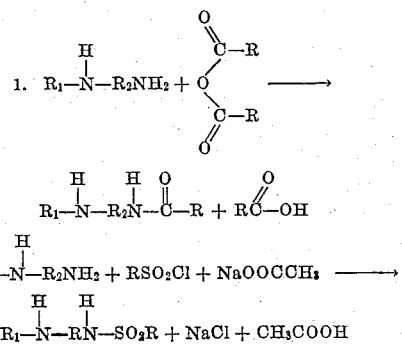

The following examples are given in support of the invention but are to be understood as illustrative only and not limiting thereof. The parts are by weight:

Example 1.—m-acetamino-phenyl beta-naphthylamine has the following formula:

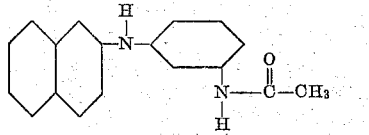

This compound is prepared as follows:

One mole of mono-B-naphthyl-m-phenylene diamine and one mole of acetic anhydride are heated together for two hours on a steam bath. The reaction mixture is then extracted with water, dried, and is crystallized several times from toluene.

The melting point of the m-acetaminophenyl beta-naphthylamine as prepared above is 136° C. The yield is very good.

The following is illustrative of the use of this compound in rubber:

1.5 parts of m-acetamino-phenyl beta-naphthylamine are incorporated in the usual manner by mixing on a rubber mill with a stock containing 100 parts of pale crepe rubber, 20 parts of zinc oxide, 50 parts of lithopone, 3 parts of sulfur, and .5 part of diorthotolyl guanidine.

This mix, A, is vulcanized in a mold for 30 minutes and 60 minutes at a temperature corresponding to a steam pressure of 40 pounds per square inch. A similar mix, B, is made from which the m-acetamino-phenyl beta-naphthylamine has been omitted. The mix is vulcanized under the same conditions. The resulting stocks are aged in the oxygen bomb for 216 hours at a pressure of 300 pounds per square inch and at a temperature of 60° C.

The tensile (T) and percent elongation (E) obtained before and after ageing are given below:

| Cure | A | | B | |
|---|---|---|---|---|
| | T | E | T | E |
| 30′ at 40#  | 2723 | 780 | 3047 | 760 |
| 60′ at 40#  | 3187 | 720 | 3338 | 700 |
| After ageing 216 hrs. oxygen | | | | |
| 30′ at 40#  | 1937 | 680 | Too poor to test | |
| 60′ at 40#  | 2290 | 690 | | |

*Example 2.*—m-(p-toluene-sulfonylamino)-phenyl beta-naphthylamine has the following formula:

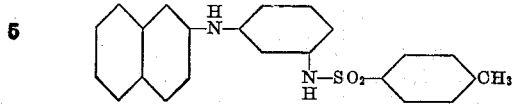

This compound is prepared as follows:

One mole of mono-B-naphthyl-m-phenylene diamine is dissolved in three liters of alcohol. One mole of p-toluene sulfonyl chloride and one mole of sodium acetate are added separately in alcohol solution while stirring. The solution is refluxed one hour on the steam bath. The reaction product is then separated from the alcohol, dried, and crystallized several times from toluene. The resulting light colored crystalline body is pulverized for use in rubber. The compound melts at 155° C.

The following is illustrative of the use of this compound in rubber:

One part of m-(p-toluene-sulfonylamino)-phenyl beta-naphthylamine is incorporated in the usual manner by mixing on a rubber mill with a stock containing 100 parts of pale crepe rubber, 20 parts of zinc oxide, 50 parts of lithopone, 3 parts of sulfur, and .5 part heptaldehyde aniline reaction product diluted with spindle oil.

This mix, A, is vulcanized in a mold for 30 minutes and 60 minutes at a temperature corresponding to a steam pressure of 40 pounds per square inch. A similar mix, B, is made from which the m (p-toluene-sulfonylamino)-phenyl beta-naphthylamine has been omitted. The mix is vulcanized under the same conditions. The resulting stocks are aged in the oxygen bomb for 216 hours at a pressure of 300 pounds per square inch and at a temperature of 60° C.

The tensile (T) and the percentage elongation (E) obtained before and after ageing are as follows:

| Cure | A | | B | |
|---|---|---|---|---|
| | T | E | T | E |
| 30′ at 40#  | 2715 | 740 | 3065 | 770 |
| 60′ at 40#  | 2890 | 730 | 3147 | 750 |
| After ageing 216 hrs. oxygen | | | | |
| 30′ at 40#  | 2097 | 710 | Too poor to test | |
| 60′ at 40#  | 1690 | 640 | | |

*Example 3.*—p-acetamino-diphenylamine is made similarly to acetyl-B-naphthyl-m-phenylene diamine. The melting point is 160° C. This chemical has the following formula:

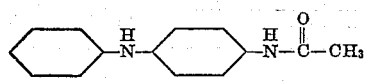

One part of p-acetamino-diphenylamine is incorporated in the usual manner by mixing on a rubber mill with a stock containing 100 parts of pale crepe rubber, 20 parts of zinc oxide, 50 parts of lithopone, 3 parts of sulfur, and .5 part of di-o-tolyl guanidine.

This mix, A, is vulcanized in a mold for 30 minutes and 60 minutes at a temperature corresponding to a steam pressure of 40 pounds per square inch. A similar mix, B, is made from which the p-acetamino-diphenylamine has been omitted. The mix is vulcanized under the same conditions. The resulting stocks are aged in the oxygen bomb for 216 hours at a pressure of 300 pounds per square inch and at a temperature of 60° C.

The tensile and percentage elongation obtained before and after ageing are as follows:

| Cure | A | | B | |
|---|---|---|---|---|
| | T | E | T | E |
| 30′ at 40#  | 2777 | 750 | 3060 | 750 |
| 60′ at 40#  | 3137 | 690 | 3248 | 690 |
| After ageing 216 hrs. oxygen | | | | |
| 30′ at 40#  | 1918 | 710 | Too poor to test | |
| 60′ at 40#  | 2027 | 610 | | |

*Example 4.*—p-(p-toluene-sulfonylamino) diphenylamine is prepared in a manner similar to that for the preparation of m-(p-toluene-sulfonylamino)-phenyl-beta-naphthylamine. The chemical melts at 147° C. This chemical is believed to have the following structure:

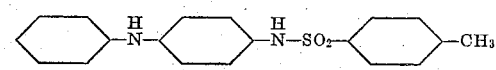

One part of p-(p-toluene-sulfonylamino)-diphenylamine is incorporated in the usual manner by mixing on a rubber mill with a stock containing 100 parts of pale crepe rubber, 20 parts of zinc oxide, 50 parts of lithopone, 3 parts of sulfur, and .8 parts of heptaldehyde aniline reaction product diluted with spindle oil.

This mix, A, is vulcanized in a mold for 30 minutes and 60 minutes at a temperature corresponding to a steam pressure of 40 pounds per square inch. A similar mix, B, is made from which the p-(p-toluene-sulfonylamino)-diphenylamine has been omitted. The mix is vulcanized under the same conditions. The resulting stocks are aged in the oxygen bomb for 216 hours at a pressure of 300 pounds per square inch and at a temperature of 60° C.

The tensiles and percent elongation obtained before and after ageing are given below:

| Cure | A | | B | |
|---|---|---|---|---|
| | T | E | T | E |
| 30′ at 40# | 3208 | 680 | 3437 | 700 |
| 60′ at 40# | 3053 | 680 | 3175 | 700 |
| Aged tensile 216 hrs. oxygen | | | | |
| 30′ at 40# | 2547 | 660 | Too poor to test | |
| 60′ at 40# | 2285 | 640 | | |

*Example 5.*—p-(p-toluene-sulfonylamino)-phenyl p-tolylamine is prepared by reacting p-amino-phenyl-p-tolylamine with p-toluene sulfonyl chloride by a process similar to that of Example 2. The chemical melts at 168° C. and gives the following analysis for sulfur and nitrogen.

| | Found | Theory |
|---|---|---|
| Sulfur | 9.11% | 9.08% |
| Nitrogen | 7.66% | 7.94% |

The product has the following structure:

One part of p-(p-toluene-sulfonyl-amino)-phenyl p-tolyl-amine is incorporated in the usual manner by mixing on a rubber mill with a stock containing 100 parts of pale crepe rubber, 20 parts of zinc oxide, 50 parts of lithopone, 3 parts of sulfur, and .6 part of heptaldehyde aniline condensation product diluted with spindle oil.

This mix, A, is vulcanized in a mold for 30 minutes and 60 minutes at a temperature corresponding to a steam pressure of 40 pounds per square inch. A similar mix, B, is made from which the antioxidant has been omitted, and is vulcanized under the same conditions. The resulting stocks are aged in the oxygen bomb for 216 hours at a pressure of 300 pounds per square inch and at a temperature of 60° C.

The tensiles and percent elongation obtained before and after ageing are given below:

| Cure | A | | B | |
|---|---|---|---|---|
| | T | E | T | E |
| 30′ at 40# | 2947 | 720 | 2910 | 720 |
| 60′ at 40# | 3065 | 690 | 2933 | 700 |
| Aged tensile 216 hrs. oxygen | | | | |
| 30′ at 40# | 2383 | 690 | Too poor to test. | |
| 60′ at 40# | 2238 | 650 | | |

Other arylsulfonylamino-phenyl-p-tolyl-amines may be prepared and used in a similar manner by replacing p-toluene sulfonyl chloride in the above process by a different aryl sulfonyl chloride all of which is within the scope of the present invention.

Examples of aminodiarylamines the acidyl derivatives of which are included within the scope of the invention are p-amino-diphenyl-amine, p-amino-phenyl tolylamines, for example, p-amino-phenyl o-tolylamine and p-aminophenyl p-tolylamine; mono-B-naphthyl-p-phenylene diamine, mono-alpha-naphthyl-p-phenylene diamine, mono-beta-naphthyl-m-phenylene diamine, and mono-alpha-naphthyl-m-phenylene diamine, and examples of acidyl groupings are those from formic acid, acetic acid, butyric acid, stearic acid, benzoic acid, furoic acid, carbonic acid, phthalic acid, succinic acid, maleic acid, malonic acid, benzene sulfonic acid, toluene sulfonic acid, and oxalic acid. Carbonic, phthalic, succinic, maleic, malonic, and oxalic acids are examples wherein the acidyl group is di-valent and is to be combined with two moles of the chosen amino-diarylamine.

Rubber stocks containing the antioxidant of Example 5 are especially free from discoloration due to the antioxidant content, when exposed to light.

The invention may be applied to rubber generally, including such as synthetic rubber, gutta percha, balata, latex or artificially prepared rubber dispersions and the term rubber is to be construed broadly. While the examples refer to certain accelerators and compounding ingredients, these may be modified as desired both as to type and proportion, without departing from the actual invention.

Having thus described my invention, what I claim and desire to protect by Letters Patent is:

1. A method of treating rubber which comprises incorporating therewith an acidyl-amino diarylamine.

2. A method of treating rubber which comprises incorporating therewith a p-acidyl-amino diarylamine.

3. A method of treating rubber which comprises incorporating therewith a material having the general formula $$(R_1—NH—R_2NH)_n—Y$$

where $R_1$ represents an aryl group, $R_2$ represents an arylene group, Y represents an acidyl group, and $n$ represents 1 or 2 depending on the valence of Y.

4. A method of treating rubber which comprises incorporating therewith an acetamino-diarylamine.

5. A method of treating rubber which comprises incorporating therewith an arylsulphonylamino-diarylamine.

6. A method of treating rubber which comprises incorporating therewith a toluene-sulfonylamino diarylamine.

7. A method of treating rubber which comprises incorporating therewith an acidylamino-phenyl naphthylamine.

8. A method of treating rubber which comprises incorporating therewith m-acetamino-phenyl beta-naphthylamine.

9. A method of treating rubber which comprises incorporating therewith an acidylamino-phenyl tolylamine.

10. A method of treating rubber which comprises incorporating therewith p-(p-toluene-sulfonylamino)-phenyl p-tolylamine.

11. A method of treating rubber which comprises incorporating therewith an acidylamino diphenylamine.

12. A method of treating rubber which comprises incorporating therewith p-acetamino-diphenylamine.

13. A method of treating rubber which comprises vulcanizing rubber in the presence of a material having the general formula

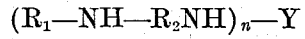

where $R_1$ represents an aryl group, $R_2$ represents an arylene group, Y represents an acidyl group, and $n$ represents 1 or 2 depending on the valence of Y.

14. A method of treating rubber which comprises vulcanizing rubber in the presence of an acidylamino-phenyl naphthylamine.

15. A method of treating rubber which comprises vulcanizing rubber in the presence of m-acetamino-phenyl beta-naphthylamine.

16. A method of treating rubber which comprises vulcanizing rubber in the presence of an acidylamino diphenylamine.

17. A method of treating rubber which comprises vulcanizing rubber in the presence of p-acetamino-diphenylamine.

18. A method of treating rubber which comprises vulcanizing rubber in the presence of an acidylamino-phenyltolylamine.

19. A method of treating rubber which comprises vulcanizing rubber in the presence of an arylsulphonylamino-diarylamine.

20. A method of treating rubber which comprises vulcanizing rubber in the presence of p-(p-toluene-sulfonylamino)-phenyl p-tolylamine.

21. A rubber product resulting from the process set forth in claim 1.

22. A rubber product resulting from the process set forth in claim 13.

23. A rubber product resulting from the process set forth in claim 15.

24. A rubber product resulting from the process set forth in claim 17.

25. A rubber product resulting from the process set forth in claim 20.

Signed at Passaic, county of Passaic, State of New Jersey, this 24th day of May 1932.

LOUIS H. HOWLAND.